United States Patent [19]

Apothaker et al.

[11] Patent Number: 4,492,951
[45] Date of Patent: Jan. 8, 1985

[54] GLASS CAPTIVATED HEATING UNIT FOR STILL OR THE LIKE

[75] Inventors: Richard L. Apothaker, Northfield; James Reed, Newfield; Carmen L. Croce, Vineland; Frederick B. Wagner, III, Elmer, all of N.J.

[73] Assignee: Kontes Glass Company, Vineland, N.J.

[21] Appl. No.: 357,790

[22] Filed: Mar. 12, 1982

Related U.S. Application Data

[62] Division of Ser. No. 241,055, Mar. 6, 1981, Pat. No. 4,334,904.

[51] Int. Cl.³ .............................................. H01C 10/16
[52] U.S. Cl. .................................... 338/316; 202/236; 202/267 R; 202/268; 202/DIG. 2; 219/301; 219/522; 219/547; 219/553
[58] Field of Search ............... 219/213, 522, 540, 553, 219/552, 547; 338/316; 202/236, 267, 206, 160, 158, 163, 153, 268, 205; 65/36, 42, 43, 59.1, 110, 154, 155, DIG. 4, DIG. 9, DIG. 11; 203/89, 72, DIG. 2, 86, DIG. 22, 91

[56] References Cited

U.S. PATENT DOCUMENTS

| | | | |
|---|---|---|---|
| 1,940,870 | 12/1933 | Litton | 65/154 |
| 2,003,956 | 6/1935 | Ronci | 65/110 |
| 2,007,111 | 7/1935 | Morgan | 219/540 |
| 2,222,742 | 11/1940 | Ducret et al. | 219/547 |
| 2,727,632 | 12/1955 | Mack | 65/36 |
| 2,813,960 | 11/1957 | Egle et al. | 219/19 |
| 2,962,684 | 11/1960 | Lien et al. | 65/36 X |
| 3,173,121 | 3/1965 | Murry | 338/316 X |
| 3,223,829 | 12/1965 | Davy et al. | 219/547 |
| 3,249,414 | 5/1966 | Hamilton | 65/110 X |
| 3,253,243 | 5/1966 | Martin | 338/316 X |
| 3,781,527 | 12/1973 | Tymzcak | 219/540 |
| 3,970,823 | 7/1976 | Volk | 219/546 |
| 4,156,127 | 5/1979 | Sako et al. | 219/301 |

Primary Examiner—Wilbur Bascomb
Attorney, Agent, or Firm—James & Franklin

[57] ABSTRACT

A capillary tube is shrunk around a wire heating element, fashioned into the desired configuration, and situated between the exterior surface of a cylindrical inner glass tube and the interior surface of a cylindrical outer glass tube, to form an assembly. The space between the adjacent tube surfaces is evacuated as a heat source is moved along the axis of the assembly to heat each longitudinal section of the assembly, in sequence. The element is thermally expanded as the outer tube surface collapses toward the inner tube surface, resulting in the fusion of the adjacent glass surfaces around the expanded element. In this manner, a channel is formed through the fused glass body which has the configuration and dimensions of the expanded element. During cooling, the element returns to its unexpanded condition. This results in a space between the channel walls and the element, permitting the element to expand, when electrically energized, without breaking the glass body.

15 Claims, 10 Drawing Figures

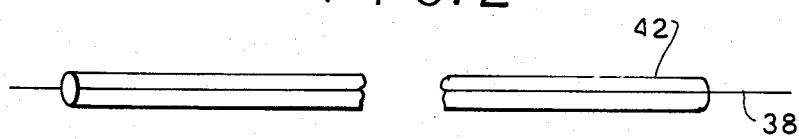
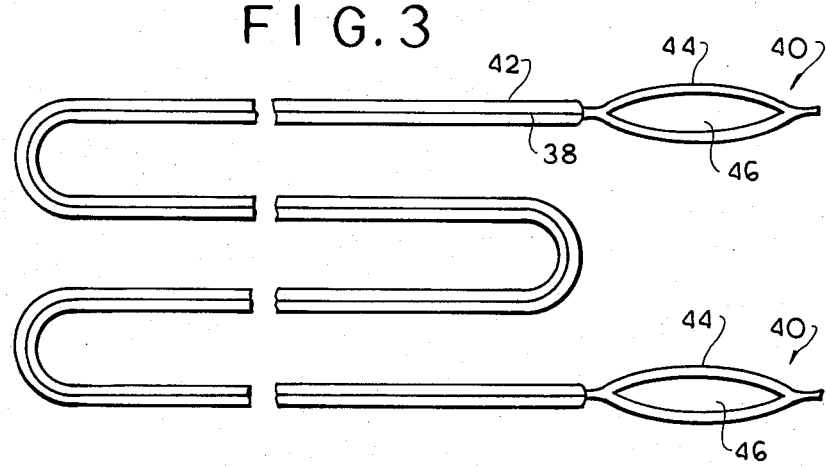
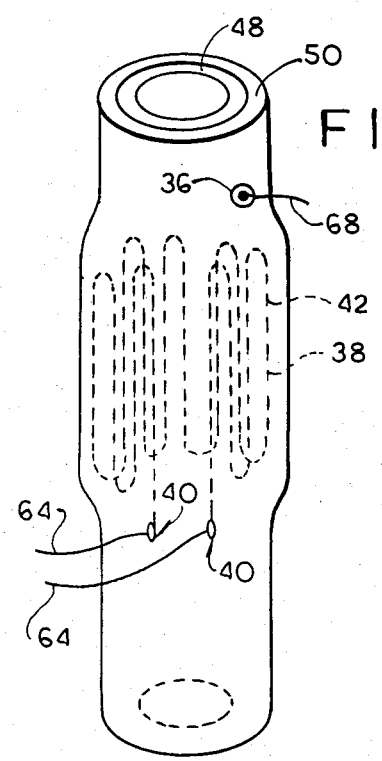
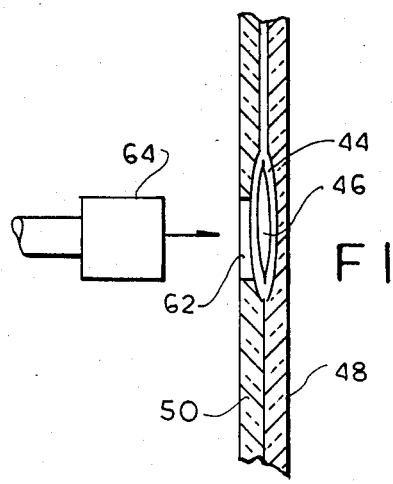

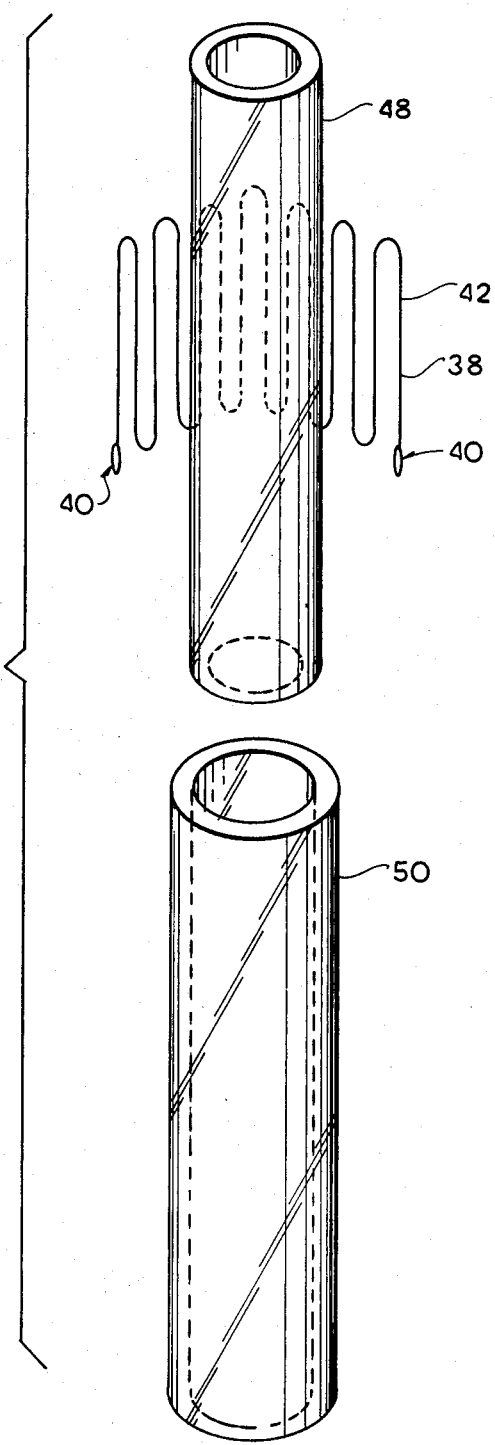

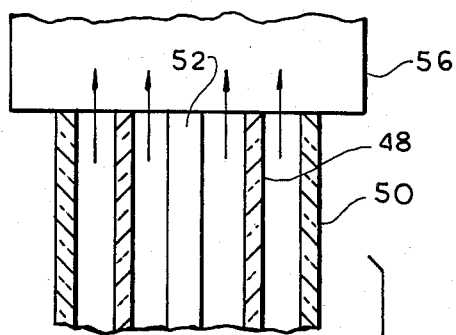
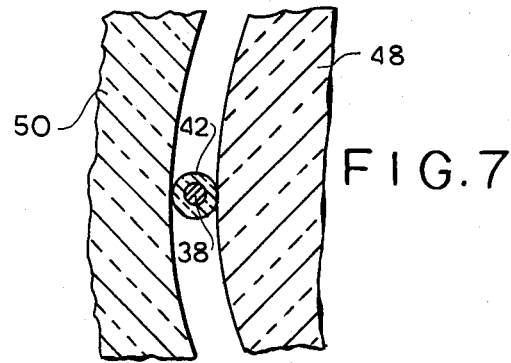
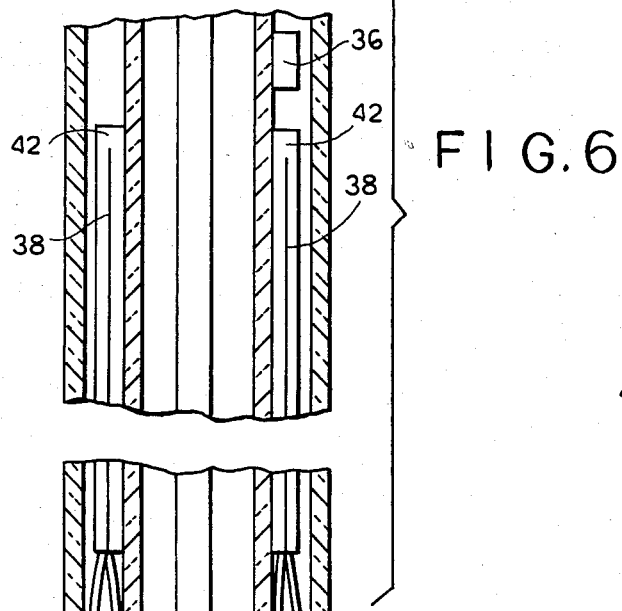
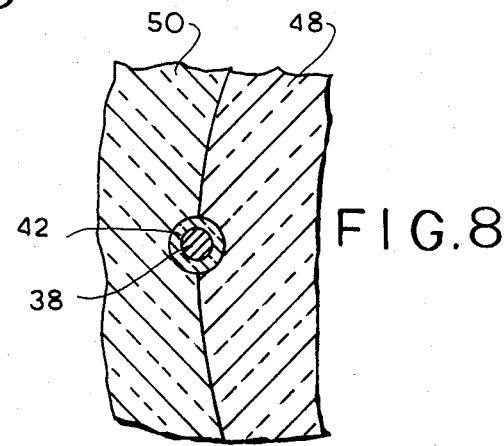
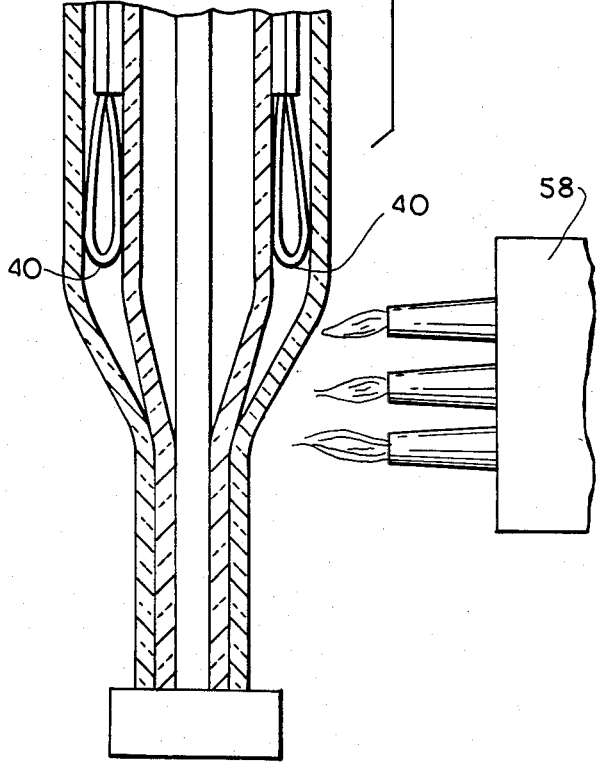

GLASS CAPTIVATED HEATING UNIT FOR STILL OR THE LIKE

This is a division, of application Ser. No. 241,055 filed Mar. 6, 1981.

The present invention relates to heating units and, more particularly, to a glass captivated heating unit designed for use for various types of laboratory apparatus, and to a method for fabricating same.

Certain laboratory apparatus, such as wiping film stills, employ distilling columns which function to separate a substance into its constituent products. To accomplish this separation, a film or stream of the liquid is created and moved along the interior surface of a glass tube or similar body. The interior surface of the tube is heated to the evaporation temperature of one of the products by an external electric heating mantle, to vaporize this product. The vaporized product is then caused to condense on a continuously cooled surface and is collected. The now vaporized product is separately collected.

In order for the apparatus to operate at maximum efficiency, it is necessary to accurately regulate the time during which the liquid contacts the heated surface and to maintain the temperature of the heated surface at a precise and stable level. The residence time during which the liquid contacts the heated surface is regulated by wipers which move the stream, at a determined rate, along the heated surface. A temperature sensing device is situated between the mantle and the exterior surface of the tube or body, and connected to a feedback loop type power regulator which is used to control the heating mantle and, thus, the temperature of the surface.

The vaporization of the liquid induces extremely high thermal transfer characteristics at the interior tube surface. Because of this, a heat sensor, located adjacent the exterior surface of the tube, will often generate inaccurate information relating to the temperature of the interior surface. This makes the control apparatus ineffective to maintain the temperature of the heated interior surface of the tube at the necessary level and may cause overheating or insufficient heating.

The conventional heating mantle comprises a resistive wire, in an insulating jacket, which is situated around the outside of the tube and connected to a power source. When the mantle is energized, the element heats up and expands relative to the tube surface. As the element expands, certain sections of the heating element are no longer in intimate contact with the exterior surface of the tube. This causes the interior tube surface to heat unevenly because the thermal coupling between the element and those portions of the surface in contact therewith is much greater than between the surface and those portions of the element spaced therefrom.

Moreover, the use of such a heating mantle is contraindicated for a number of other reasons. The tube, and thus the heating mantle surrounding the tube, may be subjected to an environment which will interact with the parts of the mantel, eventually destroying same. This may also cause contamination of the chemicals being processed. In addition, the mantle is heavy, bulky and expansive and obscures the interior of the apparatus from view.

In an attempt to overcome these problems, the heating element was embedded within the wall of the glass tube or body itself. This was done during the fabrication process, while the entire glass body was in a moltant state. The heating element was pressed into the moltant body and the body was permitted to solidify. However, when the unit was placed in operation and the heating element energized, the glass body cracked. It is believed that the breakage of the glass body was due to the different rates of thermal expansion of the element and the surrounding glass material. While the element and the surrounding material both expanded when heated, the metallic element, having a much greater coefficient of thermal expansion than the surrounding glass, expanded at a much greater rate than the surrounding body. The stresses caused within the body material by these different rates of expansion cracked the body, thereby rendering the unit useless.

In order to eliminate the problem caused by different rates of thermal expansion, attempts were made to physically or chemically bond the surface of the heating element and the surface of the surrounding glass material. However, difficulties were encountered in providing the necessary bond. Moreover, it was found that even if the necessary bond could be formed, cracking of the body material was not eliminated by this procedure.

It is, therefore, a prime object of the present invention to provide a glass captivated heating unit for still or the like and a method for fabricating same which can withstand elevated temperatures without the cracking or disintegration of the glass body material.

It is another object of the present invention to provide a glass captivated heating unit for still or the like and a method for fabricating same wherein the heating unit is completely encapsulated by the surrounding glass material.

It is a further object of the present invention to provide a glass captivated heating unit for still or the like with extremely high element-to-surface thermal coupling.

It is another object of the present invention to provide a glass captivated heating unit for still or the like and a method for fabricating same in the form of a glass tube with interior visibility.

It is another object of the present invention to provide a glass captivated heating unit for still or the like and a method for fabricating same which is operable at relatively high temperatures.

It is another object of the present invention to provide a glass captivated heating unit for still or the like and a method for fabricating same wherein the operating temperature can be accurately controlled and maintained at a stable level.

It is another object of the present invention to provide a glass captivated heating unit for still or the like and a method for fabricating same wherein all active surfaces of the unit are non-invasive.

It is another object of the present invention to provide a glass captivated heating unit for still or the like and a method for fabricating same wherein the unit can be fabricated as a precision bore Pyrex tube.

It is another object of the present invention to provide a glass captivated heating unit for still or the like and a method for fabricating same wherein a temperature sensor can be situated within the unit in the same thermal plane as the element.

It is another object of the present invention to provide a glass captivated heating unit for still or the like and a method for fabricating same wherein a conventional feedback loop controller can be used effectively to regulate and stabilize the temperature of the heated surface.

The above objects are achieved in the present invention by fabricating the heating unit in a way which provides a heating element (which is completely captivated within the body of a precision bore glass tube), with sufficient space to expand when electrically energized. Thus, the element can function without cracking the glass body. At the same time, the space between the element and surrounding material is carefully controlled to maintain all portions of the element, in its energized condition, in contact with the surrounding glass material to provide excellent thermal coupling between the element and surrounding glass body and to eliminate uneven heating of the surface of the unit.

The method of fabricating the glass captivated heating unit, in accordance with the broadest aspects of the present invention, is practiced by placing the surfaces of first and second glass layers in face-to-face relation. The heating element is interposed between the adjacent surfaces of the glass layers to form an assembly. The assembly is heated to a temperature sufficient to cause the glass to become workable. The element is caused, by the heat, to expand from a normal to an expanded condition. The glass surfaces are drawn together to join and fuse with the expanded portion of the element therebetween. The expanded element forms a channel, within the fused glass body. The channel is defined by the contours and dimensions of the expanded element.

The assembly is then allowed to cool. As cooling occurs, the expanded element returns to its unexpanded condition. This results in a void or space between the channel walls and the surface of the element because the element contracts at a greater rate than the surrounding glass. The fabrication process is carefully controlled to maintain the thermodynamic ratio of the element diameter to the channel diameter at a substantially constant level. Thus, excellent thermal coupling between the element, when electrically energized, and the surrounding glass is achieved.

In its preferred form, the first and second glass layers comprise inner and outer substantially cylindrical tubes. The inner tube has an outer diameter which is less than the inner diameter of the outer tube. The inner tube is inserted within the outer tube such that the exterior surface of the inner tube is in face-to-face relation with the interior surface of the outer tube, but is spaced therefrom.

The wire heating element, before it is interposed between the inner and outer tubes, is inserted into a glass capillary tube or sheath which is heat shrunk around the element. The element, and the surrounding capillary tube, are then formed into the required configuration. The glass coated element is placed adjacent the exterior surface of the inner tube and the combination is received within the outer tube.

Heating of the assembly is accomplished in a stepwise fashion. A heat source is moved relative to the assembly, in a direction parallel to the axis thereof, to heat each longitudinal section of the assembly, in sequence, as the assembly is rotated. Thus, the assembly is uniformly heated, one longitudinal section at a time.

During heating, it is preferable to mount the assembly on a substantially cylindrical mandrel. The space between the inner and outer tube surfaces is evacuated. In each heated section, the interior surface of the outer tube shrinks or collapses towards the exterior surface of the inner tube to fuse with same. The mandrel is preferably selected to have an outer diameter which is smaller than the inner diameter of the inner tube. The space between the mandrel and the inner tube is also preferably evacuated so as to cause the inner tube to shrink onto the mandrel to create a precision bore.

Once cooled, the expanded element returns to its normal condition, resulting in a space between the element and the channel walls. In this manner, the channel is formed to permit the element to expand, when energized, without stressing the glass body.

It is also preferable to include a temperature sensing element within the unit itself. A conventional temperature sensing element is interposed between the inner and outer tube surfaces, prior to fusing the surfaces thereof. In this manner, the temperature sensing element is placed at the surface interface and, thus, in the same thermal plane as the heating element and is an integral part of the unit.

The resulting heating unit comprises a glass body having an elongated channel therein into which the heating element is freely received, when the heating element is in its unexpanded condition. The elongated channel substantially conforms to the contours and is defined by the dimensions of the expanded heating element. Thus, the channel has a diameter and cross-section, at any given point, which is larger than the diameter and cross-sectional area of the element, when the element is in the unexpanded condition. In fact, a space in the range of approximately 20–30 microns is created within the channel between the surface of the element and the channel walls.

The material of which the element is composed is selected to inhibit bonding with the surrounding glass body. Such an element is preferably made of a nickel chrome alloy, such as nichrome.

Thus, the preferred unit comprises a glass body which is made up of inner and outer substantially cylindrical tubes and a glass coated heating element interposed therebetween, with the adjacent glass surfaces thereof fused. The heating element is freely received within a channel in the body within which it is situated. In its unexpanded condition, the element is spaced from surrounding surfaces of the body a distance sufficient to permit the element to expand when energized, without stressing the surrounding body.

When voltage is applied to the heating element, those portions of the heating element with the least physical contact with the walls of the surrounding channel heat most rapidly. This is because of the poor thermal transfer characteristics between the surface of the element and the surrounding spaced channel walls. This rapid spot heating causes the element, at that point, to expand until it closes the channel. When the channel closes in this manner, the element comes more fully into contact with the surrounding channel walls. The greater contact with the surrounding channel walls results in increased heat transfer between that portion of the element and the surrounding body. This serves to halt further expansion of the element at that point. This process cascades along the length of the element, in continuously diminishing thermal waves, until the glass reaches an equilibrium temperature.

If a localized thermal drain is introduced at any point along the unit, the channel constricts at that point, thus providing greater thermal coupling with the element at that point and bringing the unit back into equilibrium. This technique provides localized stabilization of temperature and, thus, a uniform temperature level throughout the unit.

Since the temperature sensing element is also located within the body in the same thermal plane as the heating element, the temperature sensed thereby will accurately reflect the temperature throughout the entire unit. Thus, a conventional feedback loop-type controller can be utilized effectively to maintain the temperature at the desired level.

To these objects and those which may hereinafter appear, the present invention relates to a glass captivated heating unit for still or the like and a method for fabricating same, as described in detail in the following specification and recited in the annexed claims, taken together with the accompanying drawings, wherein like numerals refer to like parts, and in which:

FIG. 2 is an enlarged representation of a portion of the heating element during the initial fabrication step of the glass captivated heating unit of the present invention;

FIG. 3 is an enlarged representation of the heating element after same has been formed into the required configuration in accordance with the fabrication process for the glass captivated heating unit of the present invention;

FIG. 4 is an exploded isometric view of the parts of the glass captivated heating unit of the present invention, prior to fusing;

FIG. 5 is an enlarged fragmentary view of a portion of the glass captivated heating unit of the present invention showing the manner in which an electrode is affixed to the heating element contact in accordance with the fabrication process of the present invention;

FIG. 6 is a side cross-sectional view of the glass captivated heating unit of the present invention as same is heated and shrunk in accordance with the present invention;

FIG. 7 is a cross-sectional fragmentary view of a portion of the glass captivated heating unit of the present invention prior to the heating and fusing of the adjacent glass surfaces in accordance with the present invention;

FIG. 8 is a view, similar to that shown in FIG. 7, of a portion of the heating unit during the heating process of the present invention;

FIG. 9 is a view, similar to that shown in FIG. 7, of a portion of the heating unit, shown after the glass captivated heating unit has cooled; and FIG. 10 is a side view of the completed heating unit of the present invention.

FIG. 1 illustrates one practical application for the glass captivated heating unit of the present invention. This figure shows, diagramatically, a conventional wiping film still which has been modified by removing the conventional heating mandrel and substituting therefor a section of glass tubing which includes the glass captivated heating unit of the present invention.

Figure 1:
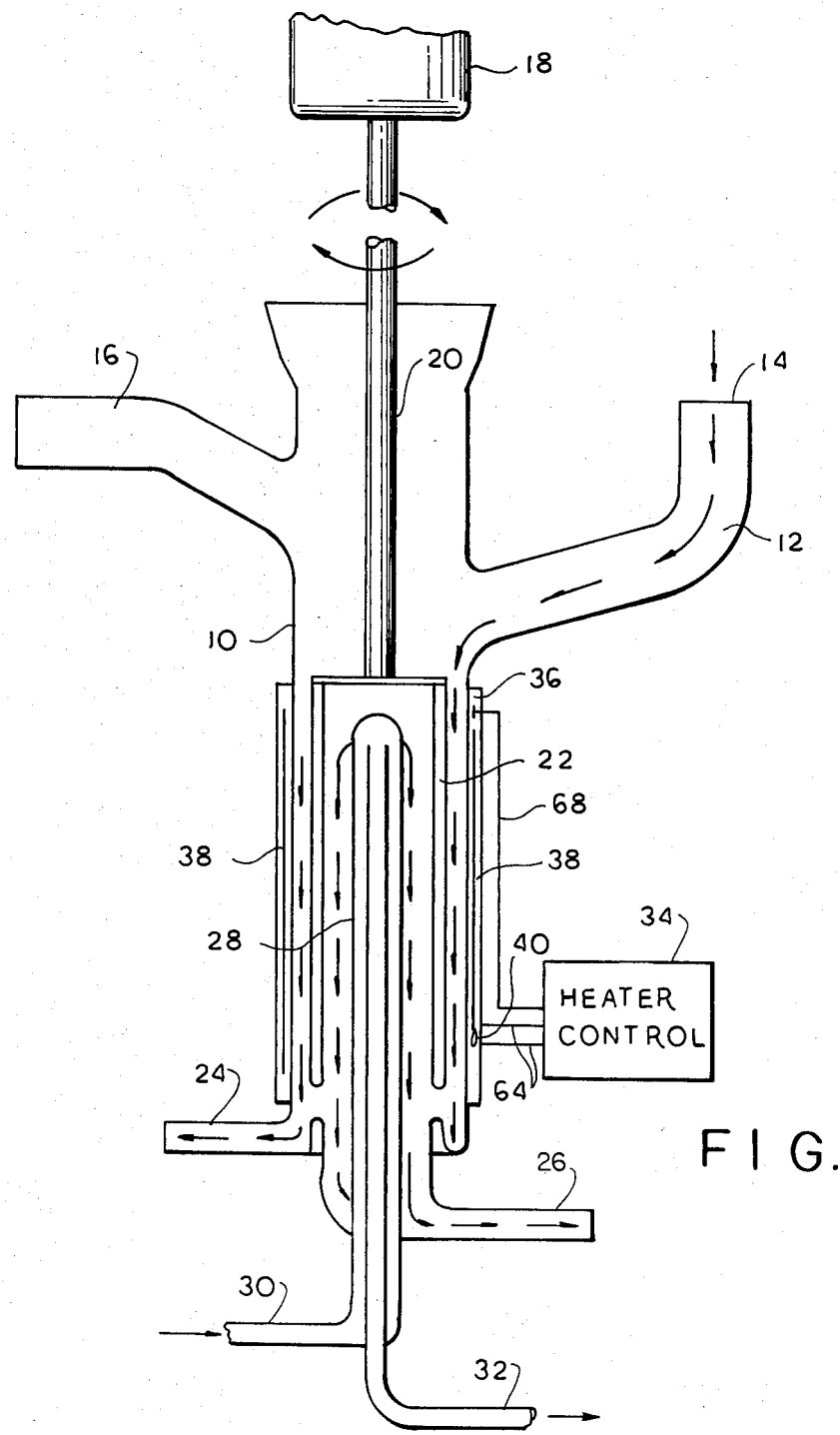
FIG. 1 is a diagramatical representation of a wiping film still incorporating the glass captivated heating unit of the present invention.

The still comprises a main glass tubular body 10, the interior of which is sealed from the environment. The upper portion of body 10 is provided with an elongated neck 12, with an inlet port 14, through which the substance to be separated is introduced into the still.

Many materials such as heavy petroleum residues, chemicals, etc., are heat sensitive, viscous and have high boiling points. To separate these materials from their other components with minimal product degradation, it is advantageous to distill these materials under vacuum. It is for that reason that the interior of body 10 is evacuated by connecting elongated neck 16 to a vacuum source (not shown). The boiling point of each component is thus lowered and thermal decomposition or polymerization is either minimized or eliminated.

At the top of the tube is provided a motor 18, the output shaft of which is connected to a rod 20, which extends through the top closed portion of body 10 and terminates in a wiper blade 22. The products separated by the still exit body 10 through ports 24 and 26, respectively. Within body 10 is situated a tubular condensor 28, which is fed by a cooling water inlet 30. The cooling water exits condensor 28 through exit port 32.

Instead of the conventional heating mandrel, which is normally secured to the exterior surface of body 10, so as to heat the interior surface of the body, a glass captivated heating unit, fabricated in accordance with the process of the present invention, has been incorporated into body 10. In this manner, visibility to the interior of the still is maintained and, in addition, the temperature of the interior surface of the body can be held at an extremely accurate and stable level by a conventional heater controller 34, of the feedback loop type, acting in conjunction with a conventional temperature sensor 36, also embedded within the wall of body 10.

The material to be separated is fed to body 10 through port 14. The material moves along neck 12 and passes onto the heated interior wall of body 10. The rotating wiper blade 22 spreads the material into a uniform thin film and continuously moves the material down the heated body wall at a predetermined rate. The interior wall of body 10 is maintained at the vaporization temperature of one of the products. The vaporized product condenses on the internal condensor 28 and the distillate flows out the outlet 26. The unvaporized material flows out through outlet 24.

The thermal degradation of a material is a function of temperature and time. If a material is exposed to its evaporation temperature for too long a time, the material quality may degrade. Short residence times at vaporation temperatures are, therefore, required. It is for that reason that the thin film is continuously moved along the heated interior wall of body 10 and why the temperature of the interior wall of body 10 must be kept at a precise level.

In order to accomplish this, and still maintain visibility to the interior of the still, a wire heating element, generally designated 38, and a temperature sensor 36 are captivated within the wall of body 10 of the still, in accordance with the fabrication process of the present invention. The heating element 38 terminates in contacts 40 (only one of which is shown in FIG. 1) which, in turn, are connected, by means of leads, to a conventional feedback loop type heater controller 34. Controller 34 acts in conjunction with temperature sensing element 36, which is also embedded within the walls of body 10, in the thermal plane of the wire heating element 38.

This structure has been heretofore impossible to achieve because, as noted above, embedding the wire heating element within the wall of a glass body, by conventional processes, resulted in the cracking of the body wall due to the different rates of thermal expansion of the wire element and the surrounding glass, when the wire element was electrically energized. However, this obstacle has been successfully overcome by the structure and fabrication of the method of the present invention.

The glass captivated heating unit of the present invention is fabricated in a manner which permits the wire heating element to expand relative to the surrounding glass body, when electrically energized, without cracking the surrounding glass body. This is because space is provided within the glass body, during the fabrication process, to accommodate the expansion of the element. The resulting unit has all of the advantages required for heating units of this type and, therefore, can be incorporated into many different types of laboratory equipment. The still described above is only one example of laboratory equipment for which the unit is suitable.

The process begins by selecting a wire element 38, the surface of which is deliberately left untreated to inhibit the formation of a glass-to-metal bond. Such a material would be a nickel-chrome alloy such as nicrome. Wire 38 is then inserted into a capillary tube 42, and tube 42 is heat-shrunk around wire 38, in a conventional fashion, as depicted in FIG. 2.

The coated wire element 38 is then fashioned into the necessary configuration, as shown in FIG. 3, and contacts 40 are fixed to either end thereof. As shown in FIG. 3, the configuration of the heating element 38 is preferably one with a number of straight, substantially parallel portions, which will eventually be situated along the axis of the unit, connected by curved portions, which will be situated near either the top or the bottom of the unit. The configuration of element 38, illustrated in FIG. 3, is the preferred configuration. However, other configurations, which function equally as well, may also be employed, depending upon the application. Thus, this particular configuration is not to be considered a limitation on the present invention.

Each of the contacts 40 comprises a stainless steel coating 44, surrounding a copper interior 46, which is crimped at either end. Once the contacts 40 are formed and the element 38 is contoured into the required configuration, the heating element 38, with its surrounding glass coating 42, and the temperature sensor 36 are placed adjacent the exterior of an inner cylindrical Pyrex tube 48 (FIG. 4). Protrusions (not shown) on the exterior surface of inner tube 48 may be provided to temporarily position the bends in the wire element.

Once the wire element and temperature sensor are situated adjacent inner tube 48, the combination is inserted into the bore of an outer cylindrical Pyrex tube 50, as shown in FIG. 4. Obviously, the interior diameter of outer tube 50 is chosen to be slightly greater than the exterior diameter of inner tube 48, such that the inner tube and surrounding element 38 may be received therein. FIG. 7 is a fragmentary cross-sectional view of how a portion of the unit appears at this point.

The assembly, formed in the manner shown in FIG. 4, is then situated within a heating apparatus, depicted schematically in FIG. 6. The heating apparatus comprises a cylindrical mandrel 52, having an outer diameter which is equal to the required inner diameter of the resulting unit. The outer diameter of the mandrel is, however, somewhat smaller than the inner diameter of inner tube 48, such that a space exists therebetween. One end of the assembly (bottom, as seen in FIG. 6) is sealed by a stopper 54. The other end of the assembly (top, as seen in FIG. 6) is connected to a vacuum source (not shown) by means of a tubular member 56. In this manner, a vacuum is maintained within the space between inner tube 48 and outer tube 50, as well as within the space between mandrel 52 and inner tube 48.

A multiple heating nozzle 58, comprising three flame jets, is situated alongside of the assembly and moved axially with respect thereto. As nozzle 58 is moved, the entire assembly is rotated, such that each section of the assembly will be uniformly heated in sequence.

As is depicted in FIG. 6, the nozzle 58 begins at the sealed end of the assembly and moves, at a constant rate, towards the end of the assembly connected to the vacuum. As each section of the assembly is heated in sequence, inner tube 48 collapses on the exterior surface of mandrel 52 and outer tube 50 collapses onto the exterior surface of inner tube 48. As this occurs, heating element 38, which has an expansion coefficient of two to three times that of the surrounding Pyrex body, expands to meet the collapsing walls of exterior tube 50. As the walls of outer tube 50 meet the walls of inner tube 48, with the glass coated heating element 38 therebetween, the adjacent glass surfaces fuse, so as to form a single glass body, as depicted in FIG. 8. It should be noted that FIG. 8 depicts a cross-sectional fragment of the glass body, wherein element 38 is in its expanded condition.

After nozzle 58 has traversed the entire length of the assembly, such that the entire assembly is heat-shrunk to the mandrel, the assembly is removed from the mandrel and permitted to cool. As the assembly cools, element 38 constricts at a much greater rate than the surrounding glass body, so as to leave a space, of approximately 20-30 microns, between the heating element and the surrounding fused glass body. This is shown schematically in FIG. 9, where the space 60, between the exterior surface of element 38 and the interior surface of the surrounding fused glass body, is greatly exaggerated for purposes of illustration.

Leads are then secured to contacts 40 by boring a hole 62 through the wall of outer tube 50, in alignment with each contact, as seen in FIG. 5. A brass lead 64 is then soldered to the exposed copper contact.

As mentioned above, it is preferable to incorporate a temperature sensor within the body of the heating unit. Sensor 36 is situated within the body at a point which is spaced from heating element 38. However, because it is situated between the surfaces of the inner tube 48 and outer tube 50, it will, when captivated within the glass body, be in the same thermal plane as the heating element 38 and, thus, will be able to provide an accurate measurement of the temperature of the glass body.

After the assembly has cooled, a bore is created in outer tube 50, over the temperature sensor 36. A lead 68, for connecting the sensor 36 to the heater controller 34, is inserted through the bore and soldered to the temperature sensor. The unit now appears as illustrated in FIG. 10.

It will now be appreciated that the heating unit which results from the process of the present invention consists of a fused glass body through which is provided a channel having the configuration of the heating element. However, the dimensions of the channel, at any point therein, are substantially greater than the dimensions of the unexpanded element at that point. Thus, a space surrounds the element. When the element is energized, it will expand to substantially fill the surrounding space. Those portions of the element, through the total length thereof, with the least contact with the walls of the channel, heat most rapidly, when energized, because there is less heat transfer at these points. This rapid spot heating causes the element to expand until it once again closes the gap between the element and the surrounding channel walls, thus producing maximum heat transfer at these points to halt any further expansion of the element.

This process cascades along the length of the element in continuously diminishing thermal waves, until the glass reaches equilibrium. If a localized thermal drain should occur at any point along the body, the channel constricts at that point to provide greater thermal coupling with the element at that point and brings the glass body back to equilibrium. This technique provides localized stabilization, remote from the site of the implanted temperature sensor.

An important consideration in the fabrication technique is the requirement for maintaining the thermodynamic ratio of the element diameter to the channel diameter at a substantially constant level along the entire channel. Precise and constant control during the heat shrinking process is required to achieve this result.

In order to test the fabrication process, a unit was fabricated of Pyrex tubing having an interior diameter of 0.030 inch and an outer diameter of 0.060 inch. The heating element was chosen to be a nickel-chrome alloy, with a resistance of 6.87 ohms/foot and a diameter of 0.0095 inch. Contacts were chosen of 316 stainless steel tubing having a 0.75 inch outer diameter and a 0.015 inch inner diameter. Prior to shrinking, the assembly was prewashed with a 10% HF solution for 30 seconds. The assembly was then rinsed with double-distilled water and rinsed again with reagent grade acetone.

The shrinking process took place at a rate of one inch per minute, at a temperature of 1950° F. The vacuum connected to the assembly had a magnitude of $2 \times 10^{-3}$ millibar. Argon was used as a purge and the assembly was rotated at 40 revolutions/minute during the heating process. The nozzle employed a warm-in portion with three in line flames and a warm-out portion with four in line flames.

The unit was tested and operated satisfactorily at a maximum temperature of 400° F., with a stability of ±0.5° F. The voltage applied was 70 volts AC, with a power of 700 watts. The maximum rise time was 1° F./second.

As will now be appreciated, the fabrication process described results in a glass captivated heating unit with extremely high element-to (inside)-surface thermal coupling. A temperature sensor, also encapsulated within the glass body at the thermal plane of the heating element, is provided. The unit has non-invasive active components in the form of an all-glass precision bore interior, and an all-glass exterior. The unit provides wrap-around heating with interior visibility and may perform at temperatures ranging to 400° F. with at least ±2° F. stability.

The heating unit fabricated according to the described method can be utilized for a wide variety of different purposes. Obviously, the particular configuration of the wire heating element and of the glass body will require alteration in accordance with the intended purpose of the unit. It is believed, however, that such alteration is well within the ordinary skill in the art. The particular unit described herein is designed for use in a thin film wiping still, as illustrated in FIG. 1, and it is for that reason that the configuration described was chosen.

Only a single preferred embodiment of the present invention has been described herein for purposes of illustration. It is, however, obvious that many variations and modifications could be made thereto. It is intended to cover all of these variations and modifications which fall within the scope of the present invention, as defined by the following claims:

We claim:

1. A glass captivated heating unit comprising a heating element of the type which expands when energized, from a normal to an expanded condition, a glass body having a channel therein, said element being freely received within said channel when said element is in the normal condition, said channel substantially conforming to the contours of, and being defined by the dimensions of said element, when said element is in said expanded condition.

2. The unit of claim 1, wherein the space between said element, in the normal condition, and the adjacent wall of said channel is in the range of 20-30 microns.

3. The unit of claim 1, wherein said element is composed of a material which inhibits bonding to the glass.

4. The unit of claim 3, wherein said material is a nickel-chrome alloy.

5. The unit of claim 1, further comprising temperature sensing means situated within said body is substantially the same thermal plane as said element.

6. The unit of claim 1, wherein said body is tubular and wherein said channel is located within the wall thereof.

7. The unit of claim 1, wherein said element has a configuration comprising an elongated part and wherein said elongated part is aligned with the axis of said body.

8. The unit of claim 1, wherein said body comprises first and second fused layers.

9. The unit of claim 1, wherein said body comprises a first cylindrical part and a tube, said first part being received within said tube, with the outer surface of said first part being fused to the inner surface of said tube.

10. The unit of claim 9, wherein said first part is a second tube.

11. A glass captivated heating unit comprising a glass body, said body comprising first and second aligned layers, a glass tube interposed between said layers, said layers and tube being fused along adjacent surfaces, and a heating element freely received within said tube.

12. The unit of claim 11, wherein said element is expandable from a normal to an expanded condition and wherein the diameter of the interior opening within said element containing tube is larger than the diameter of said element in its normal condition.

13. The unit of claim 11, wherein said element is composed of a material which inhibits bonding to the body.

14. The unit of claim 11, wherein said element is composed of a nickel-chrome alloy.

15. The unit of claim 11, further comprising temperature sensing means situated within said body is substantially the same thermal plane as said element.

* * * * *